United States Patent [19]

Gonzalvo

[11] Patent Number: 5,105,735

[45] Date of Patent: Apr. 21, 1992

[54] PERFECTED MACHINE FOR PEELING ORANGES AND SIMILAR FRUITS

[75] Inventor: Jose P. Gonzalvo, Albalat de La Ribera, Spain

[73] Assignee: Pelanar, S.L., Castell, Albalat de La Ribera, Spain

[21] Appl. No.: 375,414

[22] Filed: Jul. 5, 1989

[30] Foreign Application Priority Data

Jul. 7, 1988 [ES] Spain .................. 8802255

[51] Int. Cl.$^5$ ............................. A23N 7/00
[52] U.S. Cl. ........................ 99/590; 99/593; 99/595; 99/596
[58] Field of Search .................. 99/539–541, 99/538, 584, 588–591, 593–599; 426/482, 483

[56] References Cited

U.S. PATENT DOCUMENTS

| | | | |
|---|---|---|---|
| 1,380,259 | 5/1921 | Sharp | 99/595 |
| 1,579,771 | 4/1926 | Kools | 99/591 |
| 1,872,731 | 8/1932 | Goranson et al. | 99/593 |
| 2,483,930 | 10/1949 | Pauls | 99/596 |
| 3,113,603 | 12/1963 | Gardiner | 99/596 |
| 3,881,406 | 5/1975 | Perez | 99/599 |
| 3,982,482 | 9/1976 | Webb et al. | 99/491 |
| 4,541,331 | 9/1985 | Narisawa et al. | 99/584 |
| 4,765,234 | 8/1988 | Cailliot | 99/597 |
| 4,771,682 | 9/1988 | Ishikawa | 99/590 |

FOREIGN PATENT DOCUMENTS

| | | | |
|---|---|---|---|
| 0275810 | 7/1988 | European Pat. Off. | 99/588 |
| 8603158 | 11/1986 | Spain . | |
| 8802255 | 7/1988 | Spain . | |
| 2037147 | 7/1980 | United Kingdom | 99/598 |

*Primary Examiner*—Timothy F. Simone
*Attorney, Agent, or Firm*—Beveridge, DeGrandi & Weilacher

[57] ABSTRACT

This machine consists of a chassis equipped with two arms, at the ends of which are devices for holding the fruit and turning it. The cutter can be fixed, with the fruit being kept in contact through its own weight, the peeling being carried out by angling the axis of the fruit, or it can move round the fruit, and in this case of fruit is fixed. The movement of the cutter in relation to the fruit or vice versa is proportional, thanks to fixed or variable and/or electronic demultiplication mechanisms or devices. The fruit remains centered in relation to the arms which support it.

26 Claims, 7 Drawing Sheets

FIG. I

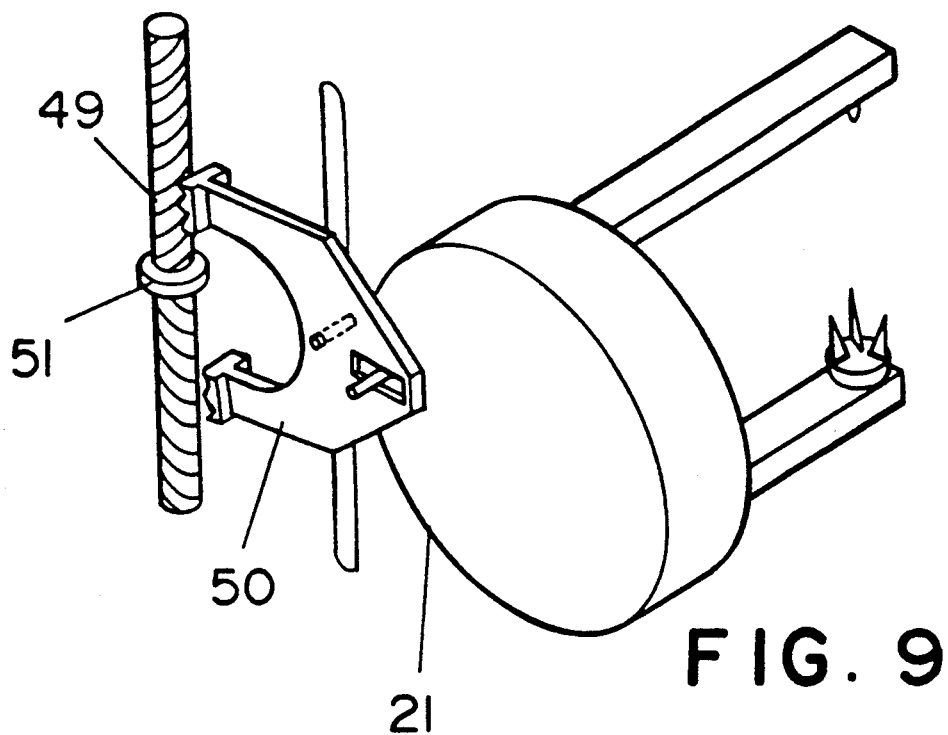
FIG. 9
FIG. 10
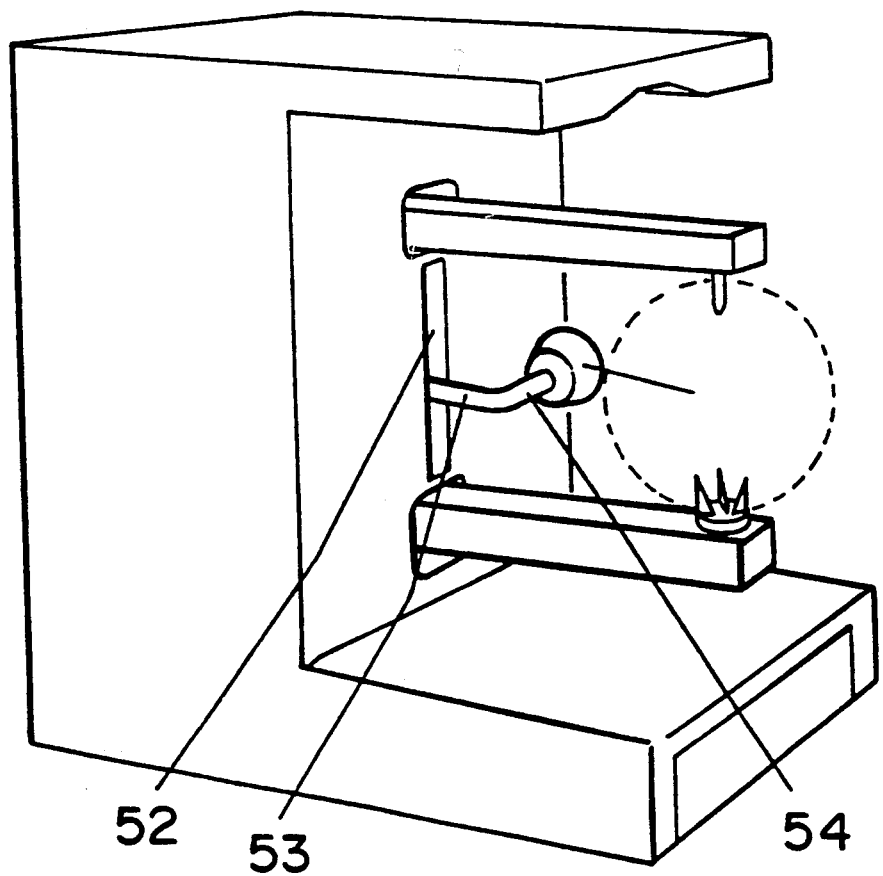

PERFECTED MACHINE FOR PEELING ORANGES AND SIMILAR FRUITS

BACKGROUND OF THE INVENTION

The inventor of the present patent is also the inventor of U.S. Pat. Nos. ESP 8603158, EP87560002.5 and ESP8802255, all of which refer to fruit peeling machines, with common objectives.

The previous technical background relating to the object of the present Patent of Invention is contained in the above mentioned patents of which the present is a new development.

Apparatus and devices for peeling oranges have to perform three essential functions, without which it is not possible to carry out the desired operation. The three functions are: fruit rotation, rotation of the cutter, and movement of the cutter or the fruit.

These three movements are relative and interdependent, i.e. the result may be equally obtained if, instead of the orange turning, the peeling unit with the rotating cutter turns around the orange.

But clearly it proves more complex and economically unprofitable to carry out an operation using means which tend to make it more difficult when a previous machine exists, as we have mentioned above, invented by the applicant of the present patent, which performs these functions simply and efficiently and whose perfection is the object of this patent.

SUMMARY AND OBJECTS OF THE INVENTION

To perform the peeling, what specifically has to be done is to carry out a helicoidal movement of the cutter round the orange so that the latter is efficiently peeled. This is performed by the rotation of the orange and the movement of the cutter along a line tangent to the orange or by rotation of the orange and the movement of the same against the cutter. The helicoidal form of this movement over the orange results from the preferably radial movement of the orange in relation to the cutter or the arm of the cutter in relation to the orange.

The method of obtaining the circular relationship in the relative travelling speed between the fruit and the cutter can be achieved in various ways, i.e. electronically, in relation to a signal which is variable in relation to the angle formed by the axis of the fruit and the cutter, obtained using a logarithmic potentiometer which varies the speed of the movement of the cutter with respect to the fruit. Also, it may be in relation to a cam which performs this function, with a spindle of irregular design or a connecting rod.

This helicoidal movement can be carried out in one single pass and can also be performed by means of two helicoidal passes over the fruit. The advantage of the single pass is its speed. The disadvantage is the greater power of the motor that is required. In both cases the result is satisfactory, and moreover with two passes the two motors can be less powerful and even capable of operating with dry batteries, as in this case it is not necessary to cut very deeply into the skin.

Another way of varying the peeling of the orange without performing a travelling movement such as described above is by varying the pressure/force with which the cutter attacks the orange, thereby achieving the same result: the knife does not penetrate too deeply into the areas over which it travels more and it penetrates more deeply into the areas over which it travels less. Comparing the orange to a globe of the world, less pressure is required at the poles than at the equator.

It is also possible to peel the orange evenly, without necessarily carrying out a perfect helicoid, by means of a sensor which allows a shallower cut at the poles of the fruit than at the center, with the same result as the devices previously mentioned.

Furthermore, and in the same connection, it is desirable that the gripper bases at the points where the turning movement is applied to the orange should be as small as possible in order to peel the maximum possible area. Therefore, the traction shaft of the machine, especially the machine that carries out the cutting in a single pass, must have gripper guides with the adequate depth and the minimum diameter. The diameter should be approximately 20 millimeters and should not be less that 15 millimeters, nor is it desirable that it should be larger than 25 millimeters.

The unpeeled portion thus obtained is minimized with respect to the peeled area, leaving two opposite caps which are easily removed.

The present invention is intended to provide a device to facilitate the peeling of oranges, which is an improvement on the technical characteristics of the above mentioned patents and moreover, its simplicity enables economical production and offers simplicity of use and great safety.

The position of the orange with respect to the cutting axis and vice versa is immaterial. The weight of the orange can press it against the cutter, but equally, a fixed tension can be applied to the cutter, for example by the weight of the motor, bringing it into contact with the orange with sufficient and even pressure so as to perform an efficient cutting of the skin, irrespective of the size of the fruit.

The orange is held between two arms equipped with a double-threaded spindle moved by a motor, or with a spring, which keep the fruit in place by pressure, the two ends of the arms having a spiked surface consisting of sharp pins or the like which, overall, occupy a minimum area according to the needs and preferred dimensions already explained above, it being preferable that their contact with the skin of the orange should not be too deep, thus facilitating the position of the fruit in the machine.

The device controlling the second pass of the cutter in machines which peel in two passes can consist of a device which, when the cutter reaches one of the ends of travel, reverses the direction of turn of the orange and travels over the surface of the orange in the opposite direction. This requires a motor which can reverse direction either by a change of polarity in the case of continuous production or by reversing the motor by means of check pieces or stops.

The second pass can also be performed by following a cam profile.

There can also be a connecting rod to perform this function or, for the same purpose, there can be a spindle with an endless reversing bidirectional thread or an eccentric cam.

The cutter should be shaped like a truncated cone and be equipped with a sensor or part which allows it to penetrate the skin only up to a specific depth. The sensor may be of variable size or eccentricity and thus adjustable. It is also possible to have a sensor which modifies the depth of cut depending on the position of the orange given that in the upper part or top the skin is always thicker than in the rest of the fruit. The cutter must be very sharp and preferably consist of small slots or teeth so that it can penetrate or cut fruit with a very thin or slippery skin. It must also be of small diameter and likewise the arms that hold and rotate the orange must be small, so that only a very small area of the orange is left unpeeled, with two easily removed caps of skin opposite each other, without losing any of the edible part of the orange in the peeling process.

The cutter can also be fitted with a separating ring of appropriate diameter to prevent the cutter from cutting into either the upper or lower holding arms.

The most suitable position for the cutter is on the lower part, so that the weight of the fruit presses it against the cutter while the fruit turns. In this case, there is a sliding compartment next to the cutter which can be concealed inside the machine and in which the pieces of skin can be collected.

The cutter can be in any position in relation to the fruit: above, below, to the left or right, in front or behind, and, depending on the position in which it is installed, a channel may or may not be fitted for clearing away the cut skin.

The cutting can also be performed using two cutters which meet on the same plane. Also on opposite planes: left-right, above-below, in front or behind.

The motive force for the movement of the orange can be transmitted by two specially shaped round pinions, one part being articulated in relation to the other thus determining the permanent meshing of the two pinions.

Where the position of the axis of the fruit is fixed with respect to its turning axis, the cutter can be guided by a groove which makes the axis of the latter adopt a radial position with respect to the orange.

It is also possible to fit two separate cutterholding arms, the second of which performs the function of carrying out the second pass when necessary, according to the particular machine.

To enable the effective peeling of all sizes of fruits, the arc describing the movement of the cutter or of the fruit is radial as the holding arms are both movable so that the machine can be adapted to any type or diameter of orange.

In the same sense and to facilitate the action of the peeler, two arms, articulated to each other, are provided to hold the orange so that the fruit remains centered with respect to its center of rotation and thus symmetrical with respect to the movement of the cutter or of the fruit with respect to the cutter. These arms may be equipped with an electric opening and closing mechanism.

In order to make the explanation which follows clearer and more intelligible, we attach to this report, as part of the same, seven pages of drawings with twelve figures which represent, by way of example, the essence of the present invention.

BRIEF DESCRIPTION OF THE DRAWINGS

FIGS. 5, 6 and 9 illustrate two separate embodiments of the mechanism for turning a fruit.

FIG. 10 is an angled view of another embodiment of the present invention having an alternate placement of the cutting means.

DESCRIPTION OF THE PREFERRED EMBODIMENT

Figure 1:
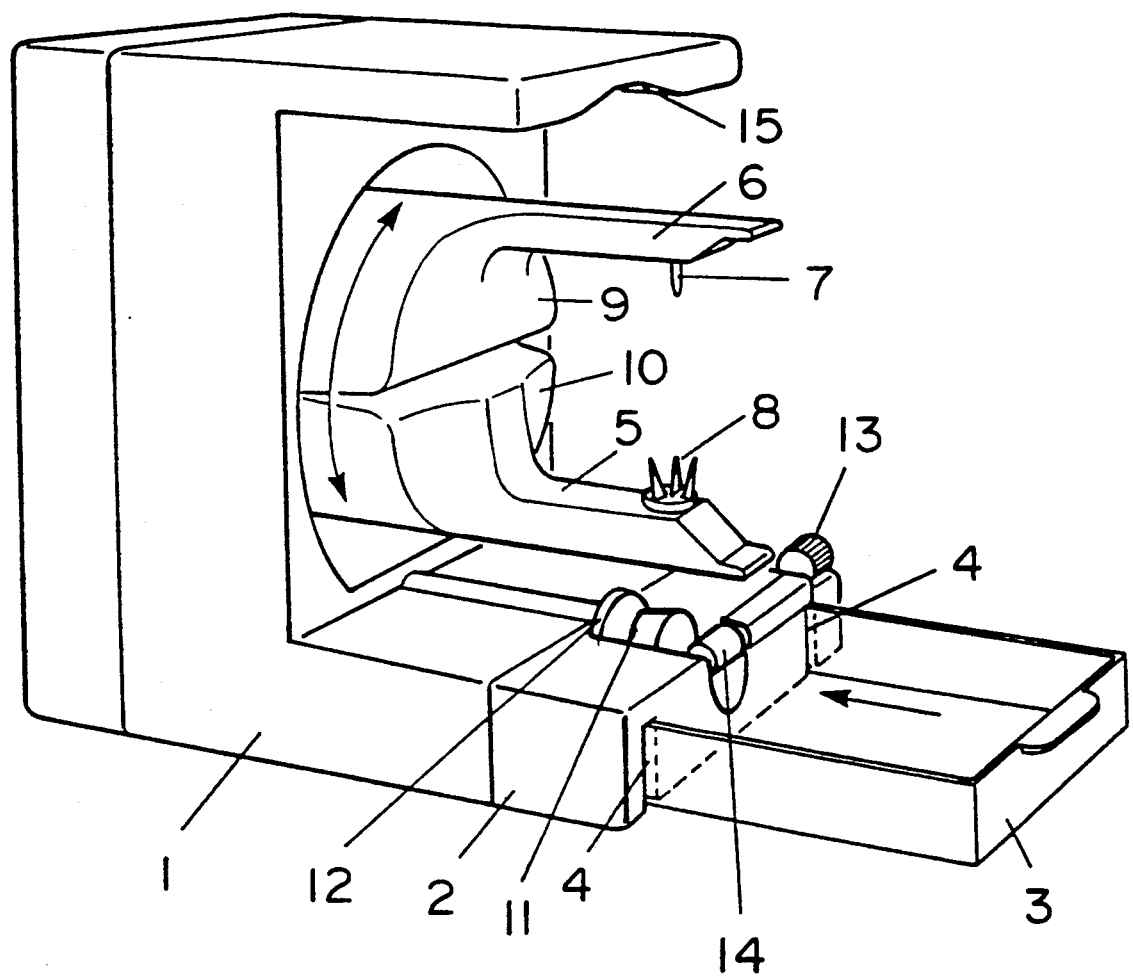
FIG. 1 shows the internal casing of one embodiment of the present invention.

FIG. 1 shows the external casing (1) of the machine, designed in any way appropriate for containing the corresponding mechanisms which we shall see below. It consists of two parts, and the part indicated as (2) is removable to enable cleaning of the parts that come into contact with the fruit and so as not to have to introduce the electric part into water. This removable part (2) also possesses a removable compartment (3) which slides inside the machine whose function is to collect the peelings. It slides along the grooves (4) so that it can be hidden if desired.

The orange is placed between the ends of arms (5) and (6) so that the shaft (7) of the arm (6) and the traction of the sharp gripper guides (8) of the arm (5) form the turning points of the fruit.

These two arms (5) and (6) are articulated according to two inner turning points so that they both open or close at a similar angle in each direction with the center of the fruit always occupying the same position.

The arms (5) and (6) are solidly joined to parts (9) and (10) which are able to turn around the horizontal axis giving the axis (7-8) of the fruit an angular variation of up to 180°.

The cutter (11) has the shape of a truncated cone. The rear part has a separating ring (12) to prevent the cutter from touching the arm (5) when the arm is holding the fruit.

The wheel (13) regulates the cutting depth through a connection with an eccentric cam (14) which, according to its position, brings the fruit to the required distance from the cutter so that the layer of peel removed can be regulated by this device.

There is a hollow (15) in the upper part of the casing to facilitate opening of the upper part of the arm (6).

Figure 2:
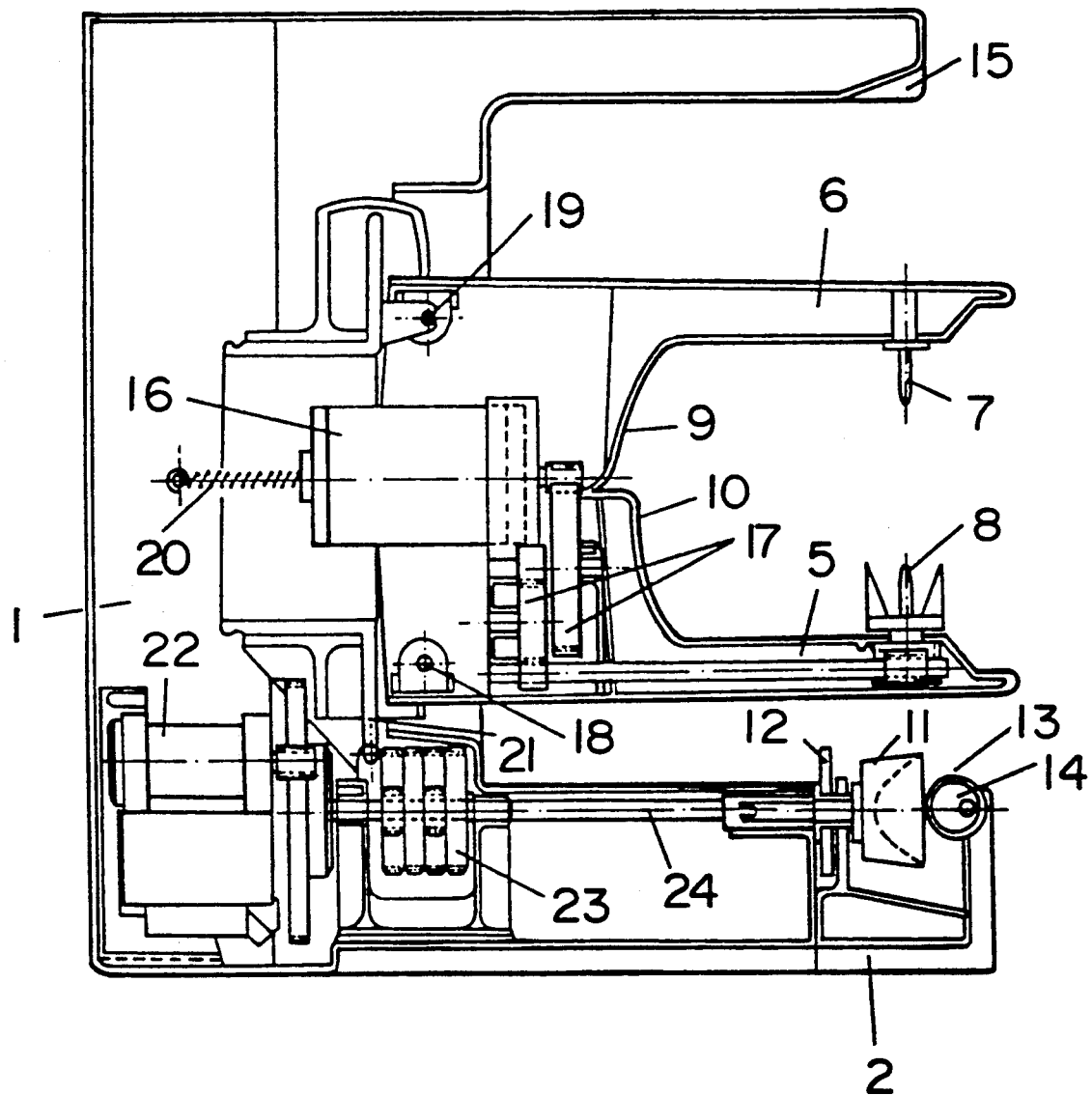
FIG. 2 illustrates a cross section of one embodiment of the present invention.
Figure 3:
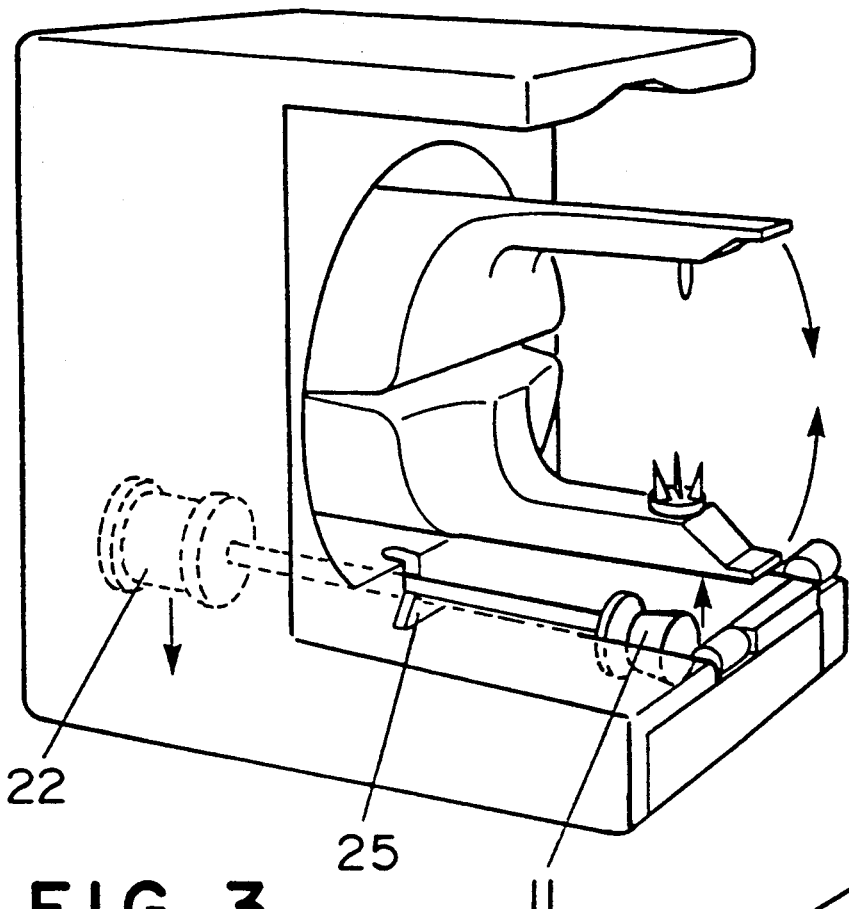
FIG. 3 is an angled elevated view of one of the embodiments of the present invention.

FIG. 2 shows an outline of a cross-section of the mechanical operation of the machine.

This figure shows a cross section of the machine in which we can see the mechanism, with the motor (16) that provides the circular movement of the base that holds the fruit by means of the transmission (17).

The arms (5) and (6) are connected to the axles indicated respectively as (18) and (19). In order to grip the fruit, a movement is imparted to the arms which brings the gripper end pieces (7) and (8) closer together. This is achieved, for example, through a spring (20) joined to the rear part of the machine which forces the arms (5) and (6) to close by tension.

The turning unit (9) and (10) is connected to a toothed wheel or crown-wheel (21) which moves according to the movement imparted by the motor (22). This motor has a reduction mechanism (23) which imparts movement on the one hand to the above-mentioned crown-wheel (21) and on the other hand to the axle (24) which transmits movement to the cutter (11). Part (21) is connected by a hinge to the demultiplicator (23), where the gearwheel which provides its movement is situated, in order to facilitate the contact of the fruit on the cutter, and they both have rounded gear-wheels allowing these parts t be appropriately positioned with respect to each other whatever angle they are at.

The upper unit, arms, motor and orange turning mechanism is suspended so that the orange's own weight brings it into contact with the cutter.

The cutter can also be connected to a central axle with the motor as counterweight, so that the weight of the said motor causes the cutter to cut into the skin of the fruit in question, as is shown in FIG. (3) where we can see the motor (22) whose weight moves the cutter (11) towards the fruit, the unit being articulated at the turning point (25).

Figure 4:
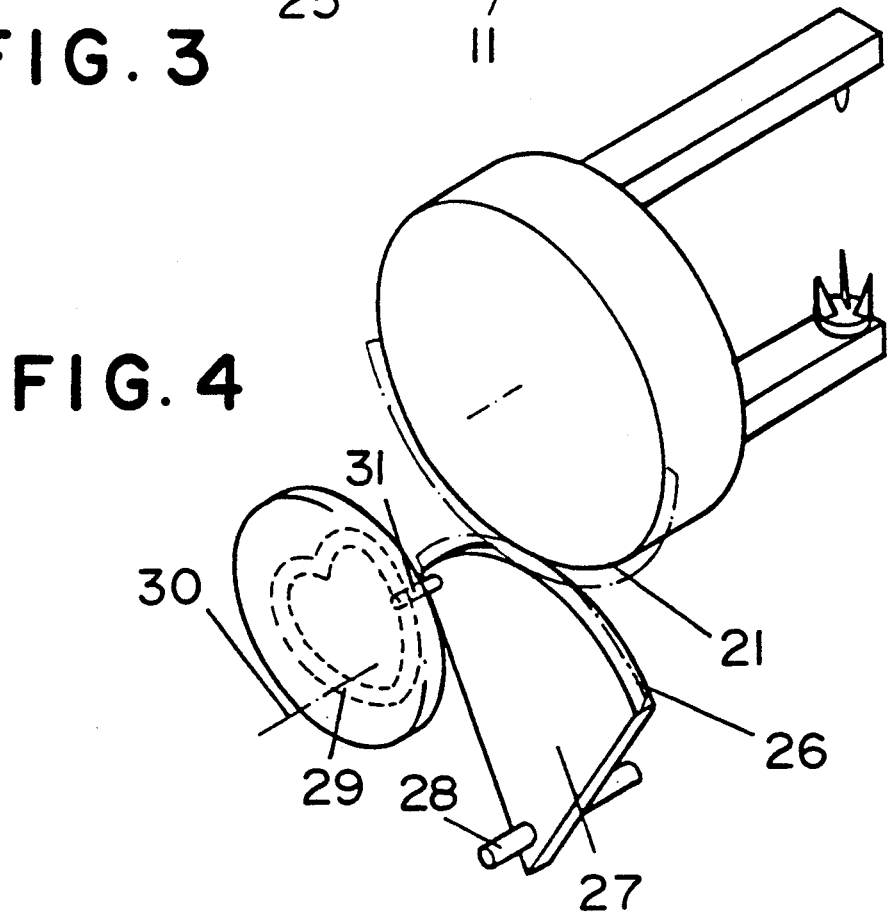
FIG. 4 shows one embodiment of the cam system for controlling the helicoidical turning of a fruit.

The cam mechanism for peeling in two passes, shown in FIG. 4, consists of a part (27) connected to an axle (28). The above-mentioned part (27) is equipped with a pivot (31) over which a specially shaped cam travels, turning round an axle (30), so that the outer shape (21) of the turning mechanism speeds up or slows down its turning movement in relation to the position of the cam (29).

Figure 5:
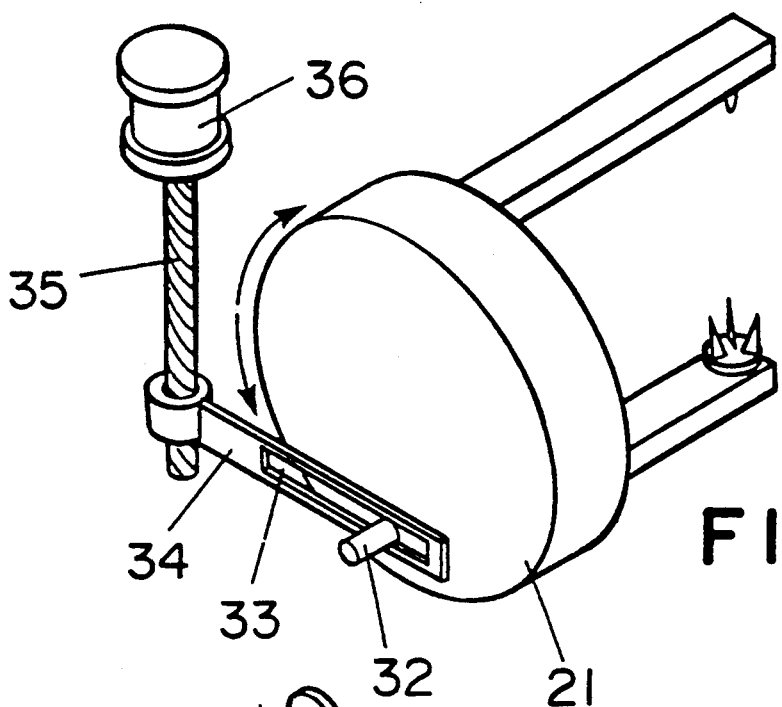

The spindle mechanism in FIG. 5 consists of a part (34) joined to a guide (33) through which movement is transmitted to the crown-wheel (21) by means of the latter's gudgeon (32), so that the spindle (35) driven by the motor (36) causes the displacement and consequently the rotation of the crown-wheel (21) and thereby of the fruit. For the reverse movement the motor that drives the spindle has to reverse its direction.

Figure 6:
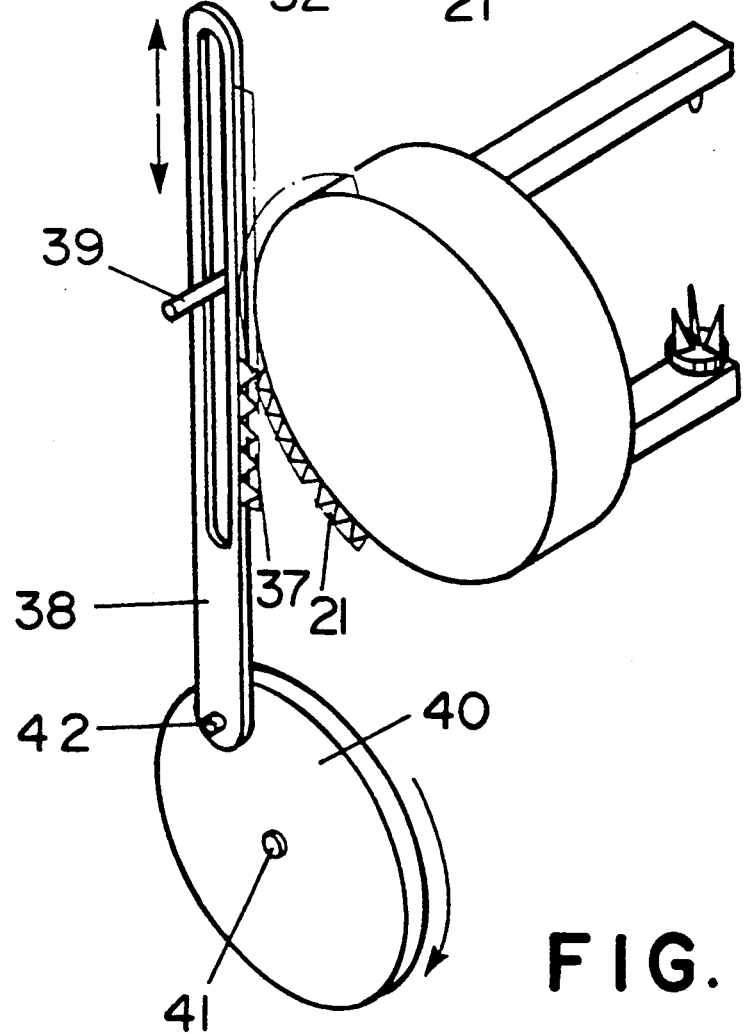

The connecting rod mechanism operates as shown in FIG. 6 by means of an eccentric cam (40), with a rotating axle (41), joined to a connecting rod (38) attached to the cam at (42) so that the outline of the connecting rod (37) which is in contact with the crown-wheel (21) has a toothed rack and is positioned by a guide pin (39).

Figure 7:
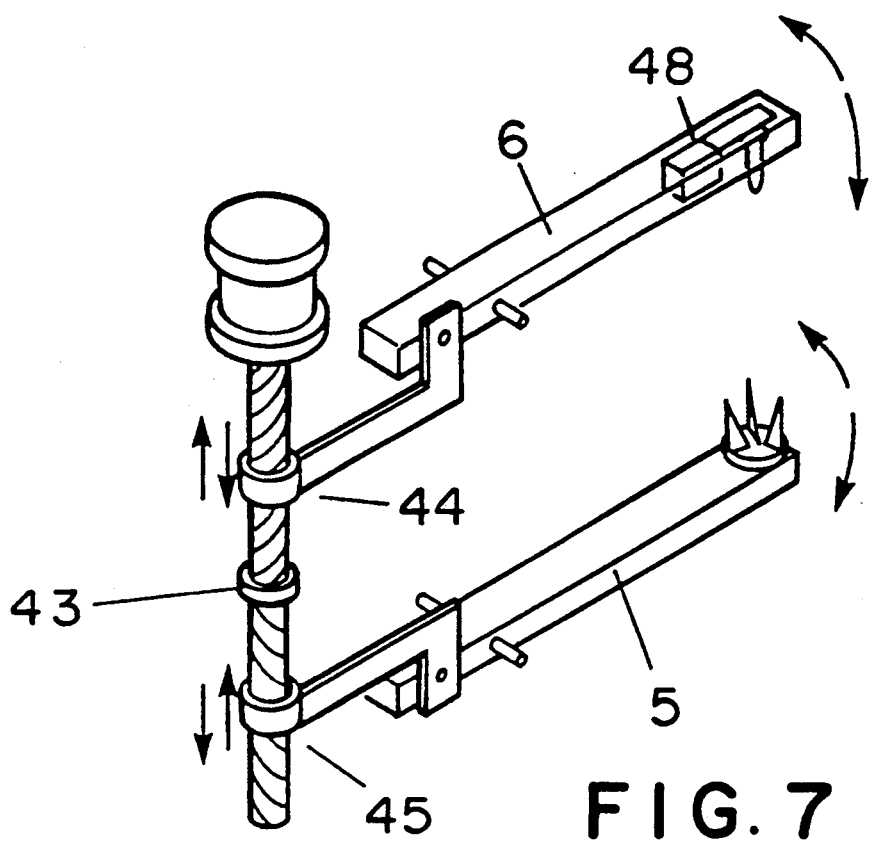
FIGS. 7 and 8 show two separate embodiments of the mechanism for opening and closing arms for holding a fruit.
Figure 8:
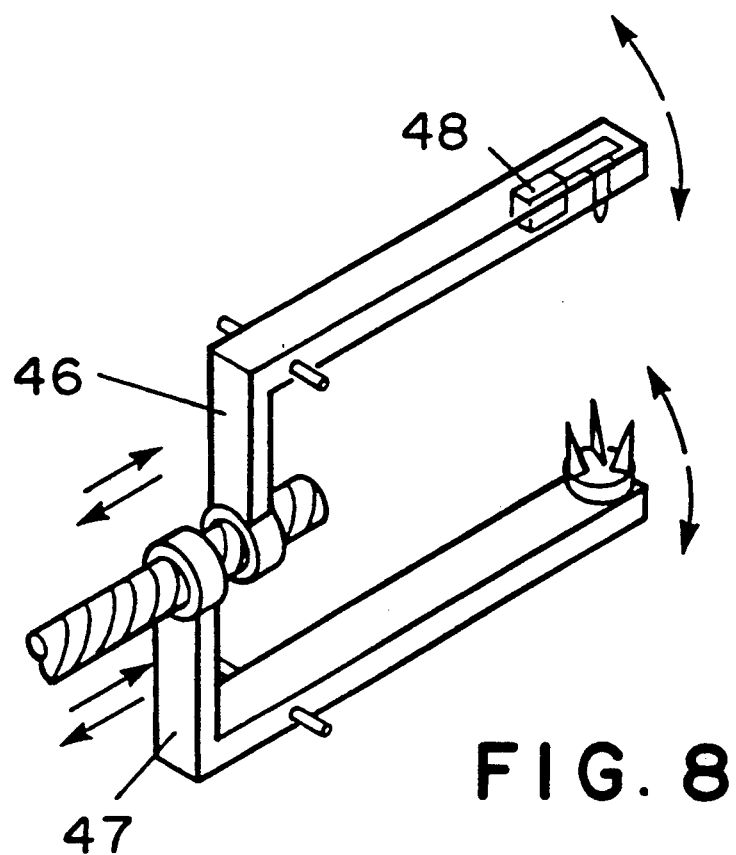
Figure 11:
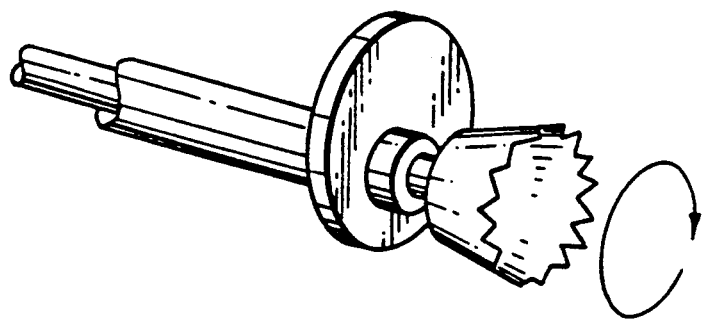
FIG. 11 shows one embodiment of the cutting means.
Figure 12:
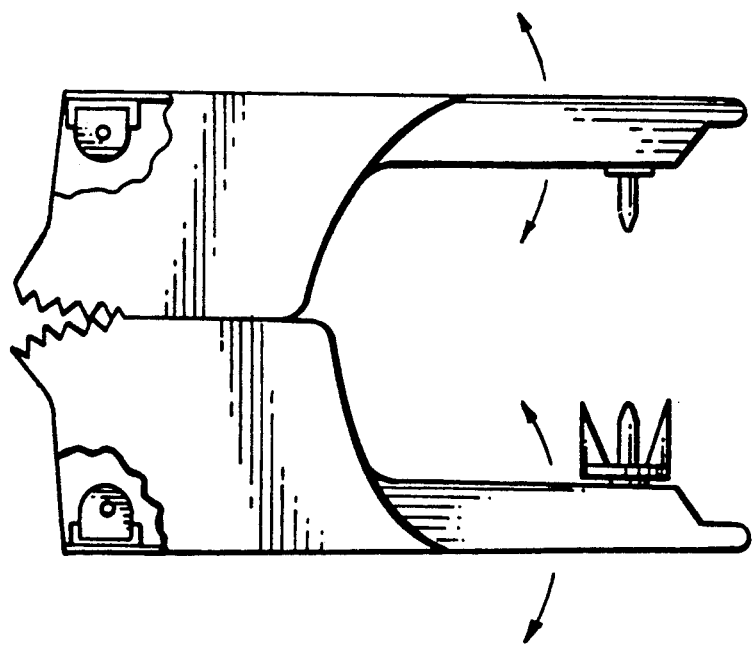
FIG. 12 illustrates a side view of one embodiment of arms for holding a fruit.

The spindle mechanism for the electrical opening and closing of the two fruit-holding arms operates in two modes shown in FIGS. 7 and 8. FIG. 7 shows a double-threaded spindle (43) which acts on two parts (44) and (45), connected to the arms (5) and (6), in such a way that their moving together or apart also causes the ends of the arms to move together or apart. FIG. 8 has a similar device connected to a horizontal spindle with a unidirectional thread, in such a way that the parts (46) and (47) joined to this thread move laterally opening and closing both arms. In these electrical arm opening-closing devices the mechanism is connected to a check piece which stops the motor when sufficient pressure has been produced between the arms.

The spindle with an endless reversing bidirectional thread is represented in FIG. 9 and consists of a spindle with a bidirectional thread (49) which is alternately connected to two ends of a part shaped more or less like a horseshoe (50) connected by a pivot pin for example to the crown-wheel (21), so that as the spindle moves the check piece (51) between the two thread-tracks on arriving at the check piece reverses the turning of the crown-wheel (21).

FIG. 10 shows a way of fitting the arm of the cutter (53) in a radially shaped slot (52) in such a way that the cutter is perpendicular (54) to the longitudinal axis of the arm (53) which is telescopic so that it can adapt to possible irregularities in the shape of the fruit or different sizes of fruit.

Having explained the characteristics of the present invention, we specify protection of the same as follows:

I claim:

1. A fruit peeling machine for peeling oranges and similar fruit products comprising
   a casing which possesses means for holding a fruit,
   cutting means,
   means for turning a fruit and
   means for tilting with constant or variable angular velocity
   i) an axis of the fruit with respect to the cutting means or
   ii) an axis of the cutting means with respect to the fruit, said means for tilting comprising a cam for controlling the angular velocity of the tilting, said cam being connected to said tilting means through a pivot, such that the rotation of the cam moves the pivot to control the angular velocity of the tilting means, and wherein
   said cutting means being a cutter which travels helicoidally over the surface of the fruit in a radial advance.

2. The machine according to claim 1 wherein said tilting means tilts up to a 180 degrees.

3. The machine according to claim 1 which further comprises electronic control of the radial advance of the cutter with respect to the turning of a fruit.

4. The machine according to claim 1 which further comprises transmission of the radial advance of the cutter with respect to a turning of a fruit by means of a spindle whose expansion is proportional to the expansion of a fruit depending on a position of the cutter with respect to a turning radius through which it travels.

5. The machine according to claim 1 wherein an arc described by the movement of the cutter with respect to a fruit or the movement of a fruit with respect to the cutter has a variable radius.

6. The machine according to claim 1 wherein the radial advance of the cutter with respect to the turning of a fruit is by means of the movement of a connecting rod.

7. The machine according to claim 1 further comprising that the cutter is equipped with a variable sensor and a separating ring.

8. The machine according to claim 7 wherein the cutter is in the shape of a truncated cone, having a series of small notches.

9. The machine according to claim 7 wherein the sensor can be adjusted manually and consists of an eccentric cylinder with a separately fitted roller that operates on its axis.

10. The machine according to claim 1 further comprising that an arm means holds a fruit and is kept apart from an arm of the cutter by separating ring means that turns freely around an axis of the cutter and is of greater diameter than the diameter of the cutter.

11. The machine according to claim 1 wherein the cutter is in the shape of a truncated cone wherein its inner part has a parabolical cross-section.

12. The machine according to claim 1 wherein the cutter has a series of small notches or teeth on its cutting edge.

13. The machine according to claim 1 wherein an angle between the cutter and a fruit is offset a few millimeters with respect to a tangent perpendicular to an axis of rotation of a fruit.

14. The machine according to claim 1 wherein a fruit is held between two arms articulated so as to allow simultaneous and controlled opening and closing of the two arms.

15. The machine according to claim 14 further comprising that the opening and closing of the arms is operated electrically, activated by a motor which drives a double-threaded spindle attached to the arms vertically or a spindle with a single thread attached to the arms horizontally, connected to a check piece, fitted preferably to the part that holds a fruit on the upper arm, that disconnects the motor when a fruit is held sufficiently firmly by the arms.

16. The machine according to claim 1 further comprising that a second pass is carried out by following a cam profile which is travelled over by a pivot pin attached to a part with a circular cross-section, one of its sides being the curve formed by a toothed arc such that this toothed arc causes the alternate turning of an inclination of an axis of the orange.

17. The machine according to claim 1 further comprising that a second pass is performed by means of a spindle with an endless reversing bidirectional thread such that each end of the spindle is driven alternately by one of the ends of a part shaped more or less like a horseshoe, the alternate displacement of which by each thread causes the return of a toothed crown-wheel which is integral with the arms which cause an inclination of an axis of an orange.

18. The machine according to claim 1 wherein arms which support a fruit are free and the weight of a fruit brings a fruit into contact with the cutter.

19. The machine according to claim 1 wherein arms that support a fruit are fixed and the cutter is moved towards a fruit by the weight of a motor fitted at the other end of an axle of a part which supports a cutter turning mechanism.

20. The machine according to claim 1 further comprising that the cutter is attached to a telescopic arm which holds the cutter perpendicular to an arm which travels radially over a fruit from a turret with a slot maintaining a radial distance, its turning axis having a maximum turn preferably of 180 degrees.

21. The machine according to claim 1 wherein the cutting means has two cutters on the same plane.

22. The machine according to claim 1 wherein cutting is performed by means of two separate cutter-holding arms.

23. The machine according to claim 1 further comprising a transmission wherein turning of a motor for the movement of a fruit is performed by rounded pinions, both parts being articulated in such a way that permanent meshing of both pinions is assured.

24. The machine according to claim 1 wherein each of the movements and operations performed and driven by an electric motor has a check piece which disconnects or connects a corresponding function and stops automatically when a peeling operation is finished.

25. The machine according to claim 1 wherein at least one of the cutter and collecting compartment are detachable for cleaning purposes.

26. The machine according to claim 1 wherein gripper bases at the points where the turning movement is applied to a fruit have a diameter of approximately 20 mm and preferably between 15 and 25 mm.

* * * * *